United States Patent
Nakanishi et al.

[11] 3,732,970
[45] May 15, 1973

[54] LIFT LOADER
[75] Inventors: Taro Nakanishi, Nishinomiya; Nobumitsu Kameo, Mihara-shi, both of Japan
[73] Assignee: Mitsubishi Jukogyo Kabushiki Kaisha, Tokyo, Japan
[22] Filed: Feb. 28, 1972
[21] Appl. No.: 229,636

[52] U.S. Cl. ............................................. 198/154
[51] Int. Cl. ............................................. B65g 17/42
[58] Field of Search ............................. 198/153, 154

[56] References Cited
UNITED STATES PATENTS
3,184,039  5/1965  Czarnecki ........................... 198/154

*Primary Examiner*—Evon C. Blunk
*Assistant Examiner*—H. S. Lane
*Attorney*—John J. McGlew, et al.

[57] ABSTRACT

A lift loader includes a substantially rectangular platform or carrier having each of its four corners connected, by a ball joint, to a respective endless chain, with the chains being trained around sprockets rotatably mounted on a supporting frame including an upper section adjustable vertically relatively to a lower section. The chains are in two sets, each including a pair of laterally spaced endless chains, and each set of chains is trained around a respective set of pairs of laterally spaced sprockets. A motor drives all four endless chains in synchronism with each other along an endless path including a carrier lifting and lowering run, a carrier return run and a pair of vertically spaced horizontal runs. A goods loading station is provided at one end of one horizontal run and a goods discharge station is provided at the opposite end of the other horizontal run. Each carrier is longitudinally flexible and includes a pair of laterally spaced link chains comprising support links articulatedly interconnected by intermediate links, transversely extending juxtaposed support plates each secured on a respective pair of support links, and keeper links insertable between adjacent support links to prevent relative pivoting of the support plates, the keeper links being spring biased to retracted positions. Adjacent the goods loading and discharge stations, the then flexible carrier is convexly curved about support rollers, "opening" the support links, and guide rails engage the keeper links as the carrier reaches the goods loading station to insert the keeper links between the then "open" support links to prevent the support links from "closing" whereby to maintain the carrier with a horizontally planar orientation during its travel along the lifting and lowering run. As the carrier passes the goods discharge station, the support links again "open" providing for retraction of the spring biased keeper links so that the carrier is again flexible during its passage along the return run. Chain take-up means are provided to compensate the endless chains for any adjustment in the relative height of the supporting frame.

6 Claims, 8 Drawing Figures

3,732,970

LIFT LOADER

BACKGROUND OF THE INVENTION

Most of the conventional lift loaders of this type employ a system in which each carrier platform is arranged to make circulation motion including vertical motion, and the slat chains forming such carrier platform are arranged bendable, so that, in such conventional devices, the carrier platform may bend out of the horizontal plane during the lifting motion, to cause instability of the goods placed on said the platforms, and excess load is applied on the slat chains. In such conventional systems, there are often employed means, such as guide rails, to keep constant the distance between the front and rear ends of each carrier platform, but these means, despite their complexity of mechanism, are still insufficient to overcome the above-said shortcomings. There is also known a lift loader of a type in which the lifting stroke can be suitably changed during operation by varying the angles of the parallelogrammatic circulation route, but this system has the defect that, when the stroke is changed, the position at which freight enters the lift loader or the position at which freight emerges from the lift loader are shifted in the horizontal direction. Also the mechanism is large in size as compared with the capacity of the lift loader.

SUMMARY OF THE INVENTION

In view of the above, the present invention is directed to providing an improved lift loader which is free of the aforementioned and other shortcomings of the prior art systems, and which has long durability and can perform the loading and unloading operation at high efficiency and with safety.

According to the present invention, there is provided a lift loader comprising four endless chains, a carrier having its four corners supported by the respective endless chains through ball joints, and which is arranged to make continuous movement along a cyclic path consisting of a lifting route and a return route, and driving means providing driving power for the cyclic motion of the carrier. The carrier comprises a plurality of plates arranged in side-by-side relation in the moving direction of the carrier, and a plate-retaining link chain consisting of a plurality of link plates adapted to hold the first-mentioned plates in securely joined relation. Retainer or keep plates or links guided by guide rails are inserted between adjacent link plates or support links immediately before the carrier enters the lifting route during the cyclic movement, and then, when the carrier passes near the starting end of the lifting route, cargo or goods are placed on the carrier. As the carrier follows the lifting route, its movement including a vertical motion while keeping the horizontal state with action of the keep plates inserted between the respective link plates, and when said carrier passes near the termination of the lifting route, cargo leaves the carrier, and upon moving out of the lifting route, said carrier makes a convex curve outside of the cyclic path to open out the link plates to cause the keep plates to be displaced and disengaged from the link plates by the action of spring means, and wherein the cargo lifting stroke can be controlled by vertically adjusting at least one of the upper deck and the lower deck supporting the starting end or the terminal end of said lifting route and slack or shortage of said endless chains resulting from such adjustment can be compensated by chain take-up means provided at a position in said return route where engagement of said keep plates with the link plates has been released.

DESCRIPTION OF THE PREFERRED EMBODIMENT

Figure 1:
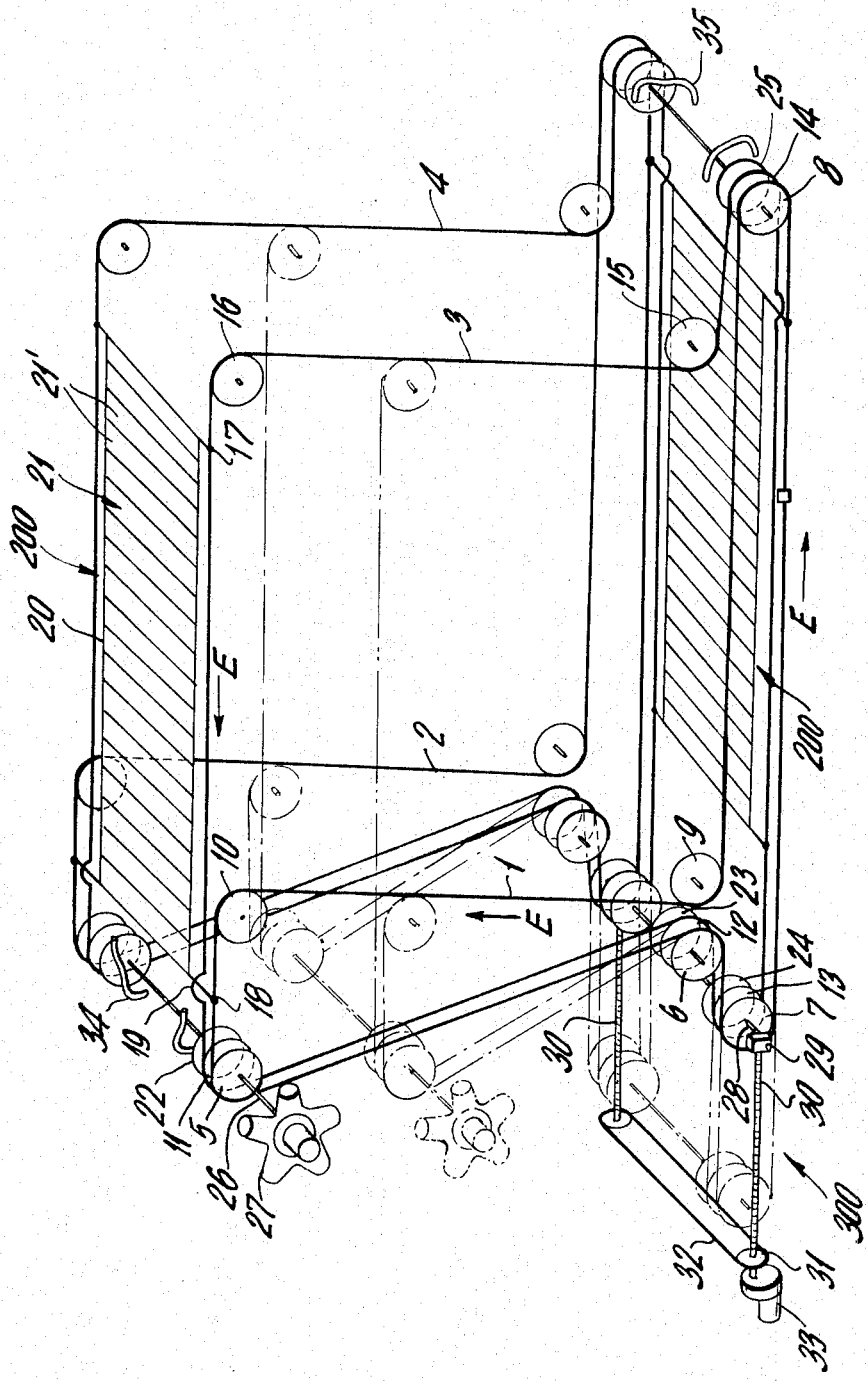
FIG. 1 is a perspective view showing the general arrangement of the lift loader according to an embodiment of the present invention.

Now, the invention will be described in detail by way of a preferred embodiment thereof with reference to the accompanying drawings.

The lift loader according to this embodiment employs two carrier platforms in the mechanism. Each carrier platform 200 is supported at its respective four corners by four suspended endless chains 1—4, respectively. Each of the suspended chains 1–4 has a pair of supporting points 17 and 18 and, at these points the respective corners of the platform 200 are joined to respective suspended chains 1–4. Each of the supporting points 17, 18 comprises a ball joint mechanism, adapted to ensure smooth movement of the chains as well as the carrier platforms, to be described later, free of any undue restriction at these points. The carrier platforms 200 are so arranged that they are equally spaced apart from each other on their path along suspended chains 1–4, so as to allow disposal of goods at substantially equal intervals in the goods transfer and discharge operation to be described later, but the distance between the carrier platforms 200 may be changed according to the particular situation in which the lift loader is used. Suspended chains 1 and 2 are guided by sprocket wheels 5–10 and chains 3 and 4 are guided by sprocket wheels 11– 16. Sprocket wheels 5–16 are provided in pairs arranged in opposed relation on both sides of the carrier platform. The sprocket wheels 5–11 have a common driving shaft 26 adapted to transmit the driving force of a driving motor 27 to sprocket wheels 5 and 11. Thus, when the driving shaft 26 is actuated by motor 27, it causes suspended chains 1–4 to move at equal velocity to accordingly cause carrier platforms 200 to make a circulation motion.

In the circulation path on which each carrier platform 200 moves cyclically, the course spanning from the sprocket wheels 8, 14 through sprocket wheels 9, 10, 15, 16 to sprocket wheels 5, 11 is the "lifting" route, while the course spanning from the sprocket wheels 5, 11 through sprocket wheels 6, 7, 12, 13 to sprocket wheels 8, 14 is the "return" route. When the chains 1–4 move in the direction of arrow E, the motion of the carrier platform 200 in the lifting route is an ascending motion, and when these chains move in the opposite direction, it is a descending motion. At the sections where the carrier platform 200 makes a turn during the circulating motion, there are provided paired guide rollers 22, 23, 24, 25 to guide such turning of the platform.

Figure 2:
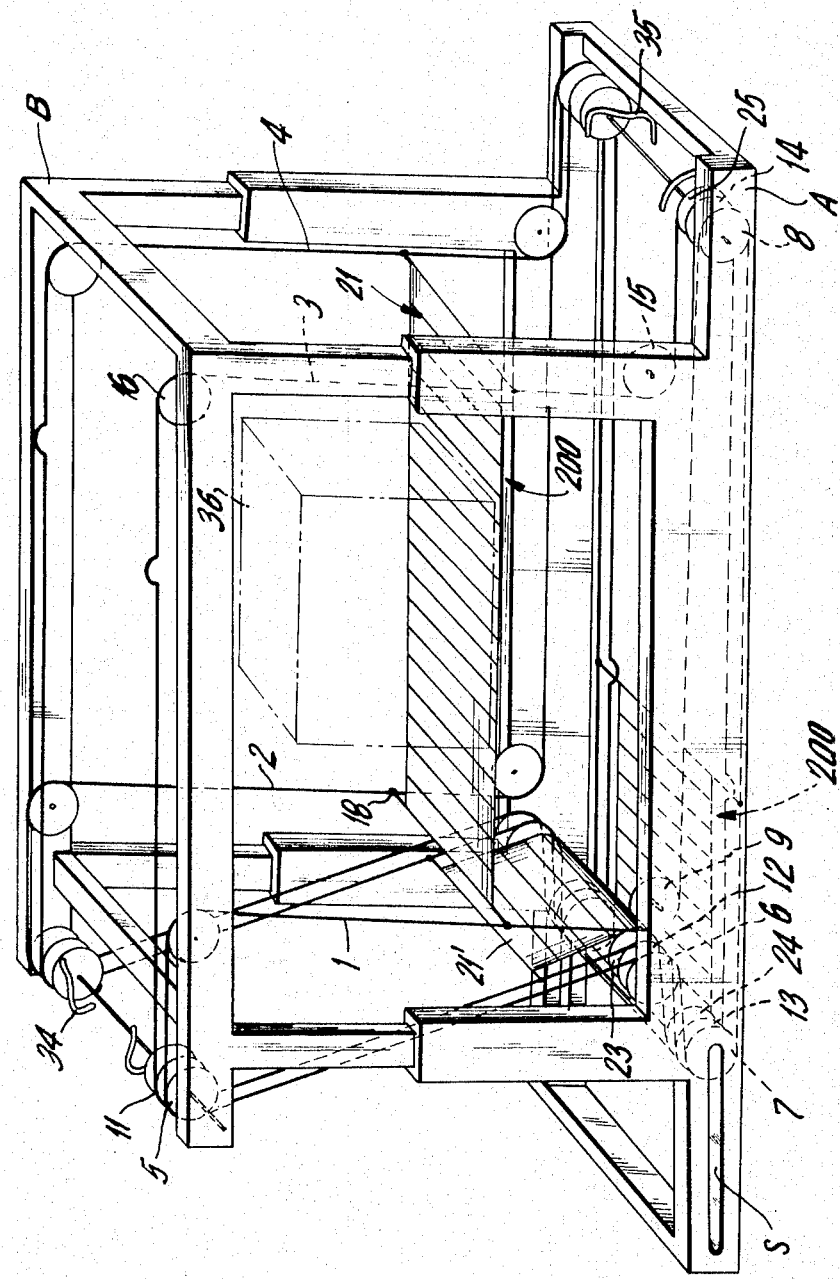
FIG. 2 is a perspective view showing an operating condition of the lift loader shown in FIG. 1.
Figure 3:
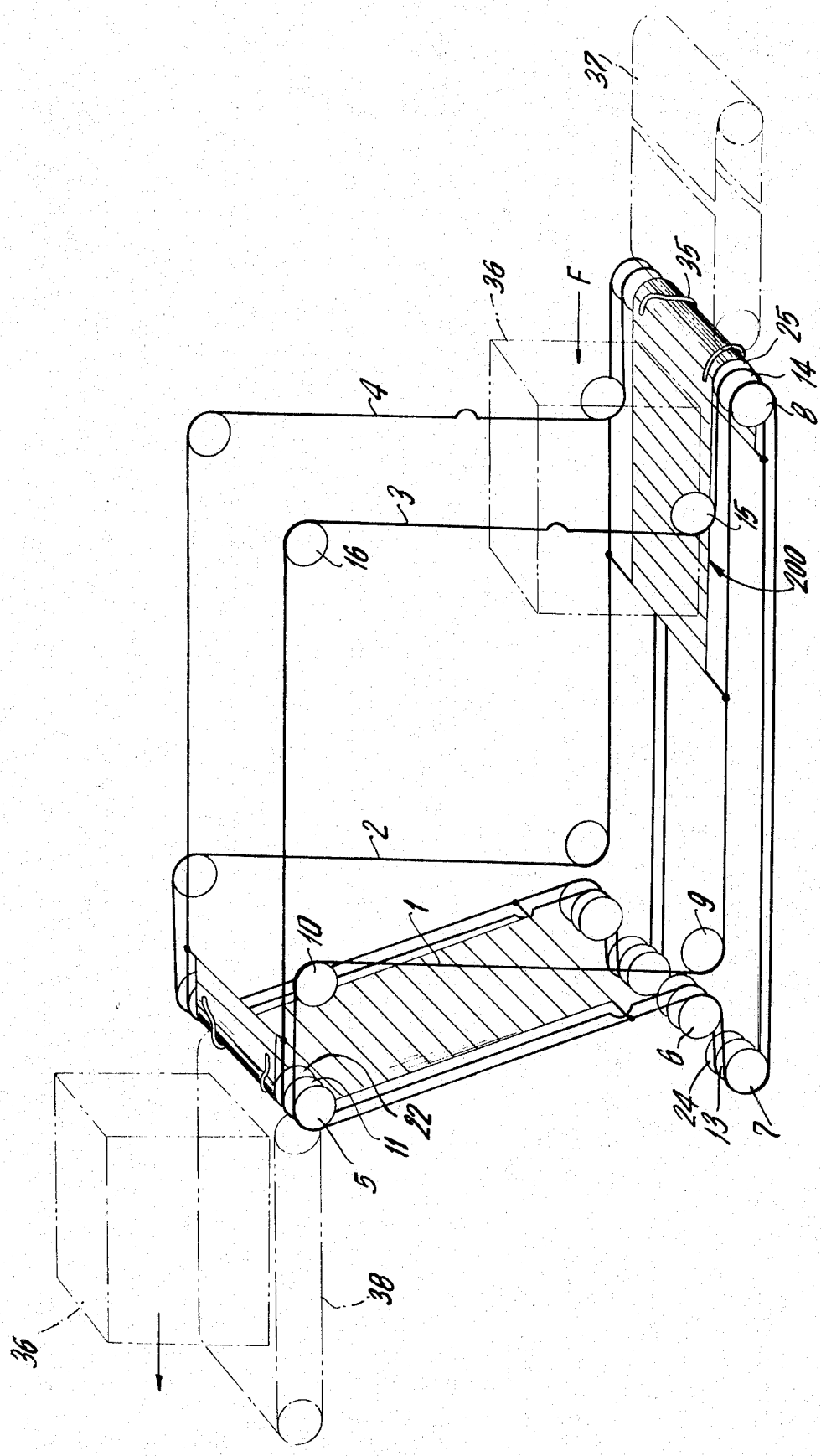
FIG. 3 is a perspective view showing a condition in which a piece of goods is being loaded on a carrier platform of said lift loader and a condition in which said piece of goods is being unloaded from said carrier platform.

In the case of lifting up goods by the illustrated lift loader, the receiving and discharging of said the goods are conducted in the manner shown in FIG. 3. Namely, a goods package 36, which was carried on a conveyor 37 into the lift loader, is transferred onto a carrier platform 200 which has just passed the sprocket wheels 8, 14 in the manner as indicated by arrow F. Carrier platform 200 advances along the lifting route with the goods package 36 rested thereon while maintaining a planar condition, as described more fully later, and when the leading end of the platform reaches the position of sprocket wheels 9 (at this time, the rear end of the platform is located at the position of sprocket wheels 8), the platform 200 is lifted up therefrom to the positions of sprocket wheels 10 and 16 (see FIG. 2). The goods package 36 leaves the platform 200 at the position of sprocket wheels 5, 11 and is carried away on a discharge conveyor 38. In case of lifting down the goods, the above operation is conducted contrariwise (in this case, the goods package is carried in on the conveyor 38 and carried away on the conveyor 37).

The lower deck A is fixed to the floor by suitable means (this lower deck may be the machine underframe or a part thereof depending on the type of the lift loader used). Supported by this lower deck A are the sprocket wheels 6, 7, 8, 9, 12, 13, 14, 15, guide rollers 23, 24, 25 and later-mentioned guide rails 35. Of these members, the relative positions of the sprocket wheels 6, 8, 9, 12, 14, 15, guide rollers 23, 25 and guide rails 35 are invariable. As shown in FIG. 2, the slots S extending horizontally are provided in lower deck A, and the axles of the sprocket wheels 7, 13 are slidably engaged in said slots S.

The upper deck B is mounted to slide up and down on lower deck A and designed such that it can be set at a desired vertical position by suitable driving means (not shown). Supported by this upper deck B are the aforementioned sprocket wheels 5, 11, 10, 16, guide roller 22 and later-mentioned guide rails 34, and the positional relations of these elements remain unchanged irrespective of the vertical position or height of the upper deck B.

It will thus be understood that the lifting stroke of the goods 36 can be adjusted, for instance, from the position of the solid lines to the position of the chain lines in FIG. 1, by changing the height of the upper deck B. Any slack or shortage of the suspended chains 1–4 resulting from such adjustment of the lifting stroke of the goods 36 can be compensated by operation of the chain take-up device 300. For example, in the case of lowering the highest position of the listing stroke of the carrier platform 200, a geared motor 33, for actuation of sprocket sheels 7 and 13, is operated to rotate a pair of screws 30 for moving a pair of bearing boxes 29, through or without medium of the sprocket wheels 31 and synchronized driving chain 32, whereby the pair of bearing boxes 29 engaged with screws 30, a shaft 28 supported by bearing boxes 29 and the sprocket wheels 7 and 13 supported on shaft 28 are all displaced along the slots S of the lower deck A in the direction where they are projected outside of the circulation path of the carrier platform 200 so as to elongate the return route to thereby compensate the slack of the chains 1–4. On the other hand, in the case or raising up the highest position of the lifting stroke of the carrier 200 from the chain line position to the solid line position in FIG. 1, the chain take-up device 300 is operated contrariwise to the above procedure to thereby compensate shortage of the suspended chains 1–4.

Each carrier platform 200 consists of a goods-carrying plate assembly 21 of a slat conveyor type arrangement and a pair of plate-retaining link chains 20. This plate assembly consists of a plurality of strip type plates 21' arranged in side-by-side relation in the direction of the circulation motion of the carrier platform 200. Each plate-retaining chain link 20 comprises a plurality of links 39–43 which are adapted to relatively rotatably couple the adjoining strip plates 21' by the operation of chain rollers 45, 48, bushes 46 and chain pins 47, 49. Having the above-described construction, the carrier platform 200 is usually bendable either forwardly or backwardly, but when it passes along the lifting route, it maintains a straight level, or horizontally planar, configuration owing to interengagement of the link plates or support links 43 and the keep plates 44 (which may be pin-shaped). Namely, when the carrier platform 200 enters the lifting route, it passes round the guide rollers 25, at which position a pair of guide rails 35 are provided, and each keep plate 44 is inserted between adjacent fan-like opened support links 43 of the carrier 200 under the guidance of the guide rails 35. Support links 43 are kept closed thereafter throughout the course of the lifting stroke and remain engaged with the keep plates 44. Resistance against wear can be improved by enlarging the contact areas between the support links and the keep or retainer plates when they are engaged.

Figure 4:
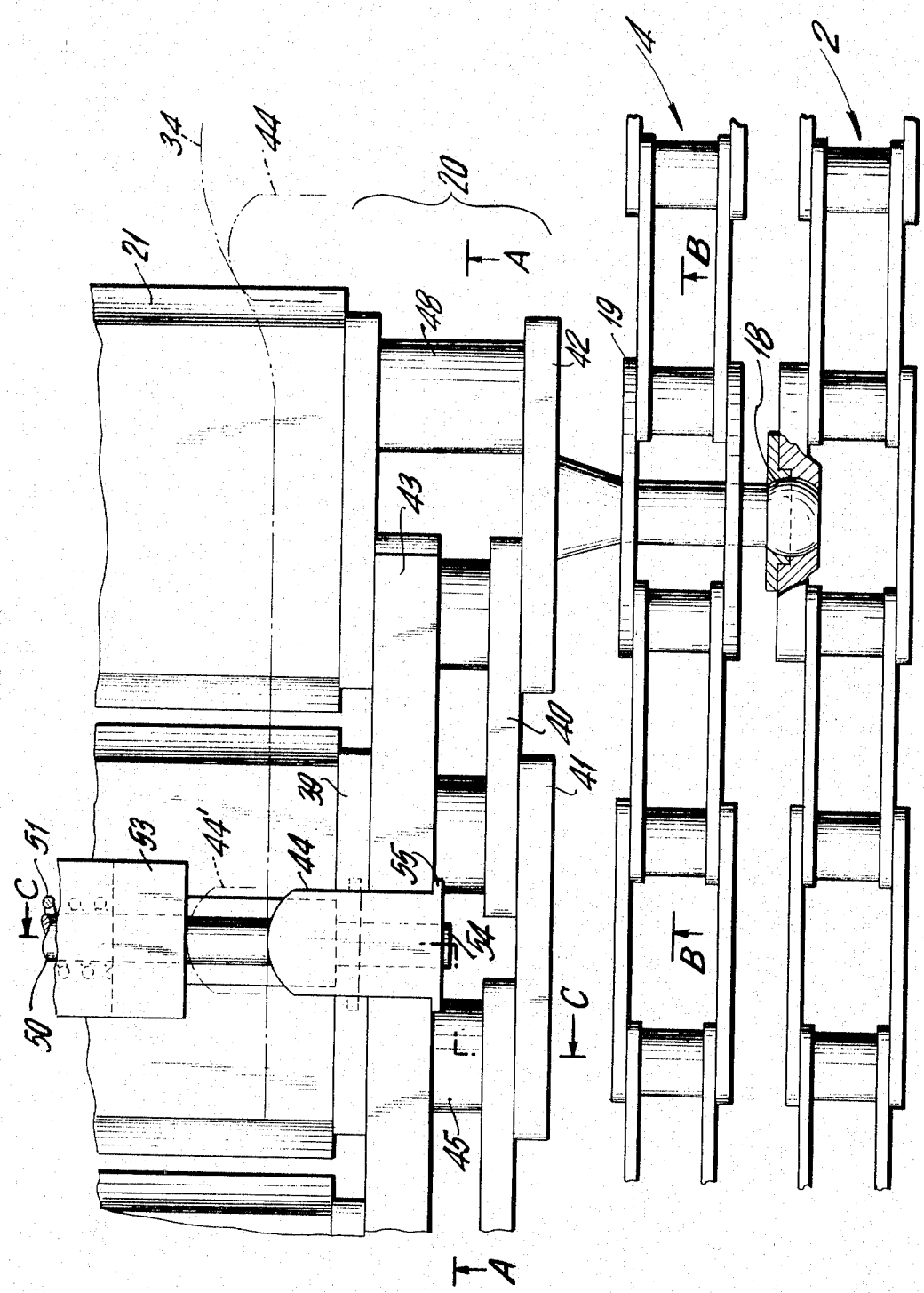
FIG. 4 is an enlarged plane view of the essential parts of said carrier platform.
Figure 4A:
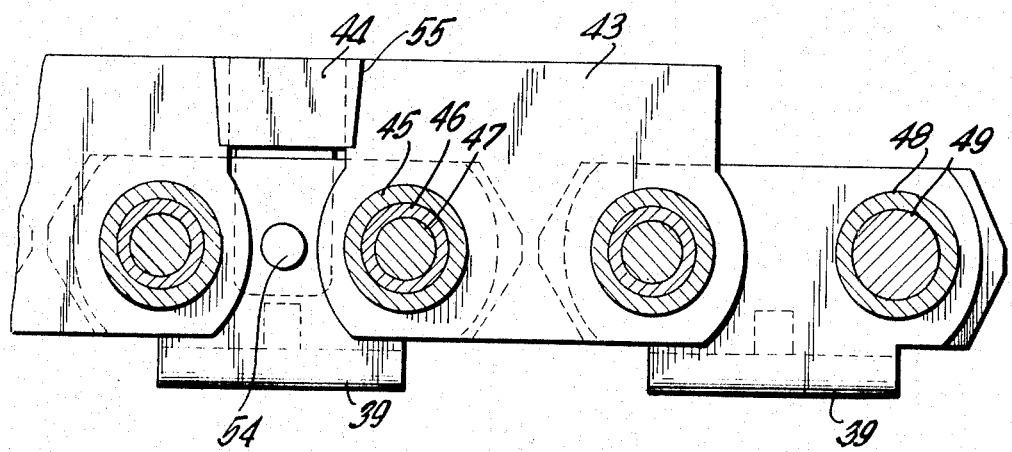
FIG. 4A is a sectional view taken along the line A—A of FIG. 4.
Figure 4B:
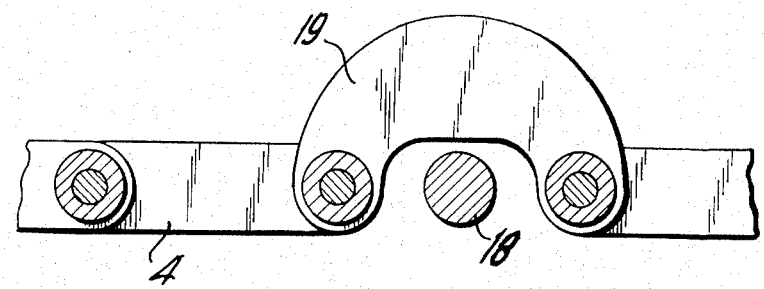
FIG. 4B is a sectional view taken along the line B—B of FIG. 4.
Figure 4C:
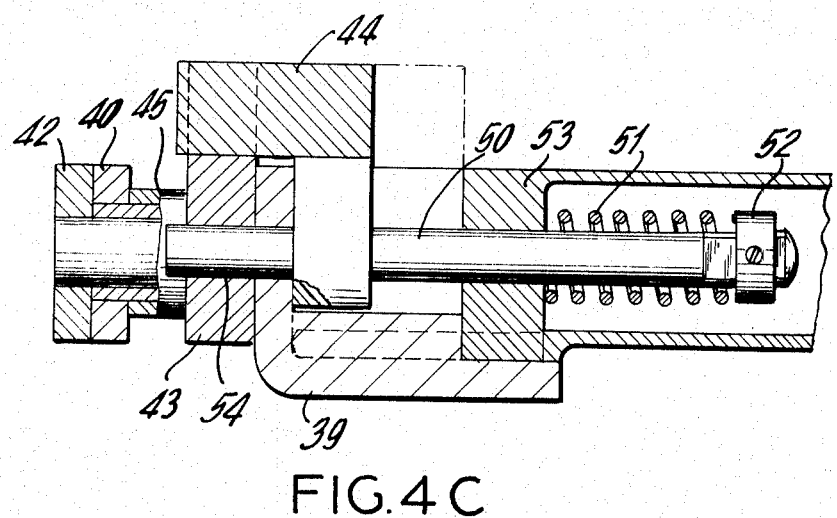
FIG. 4C is a sectional view taken along the line C—C of FIG. 4.
Figure 5:
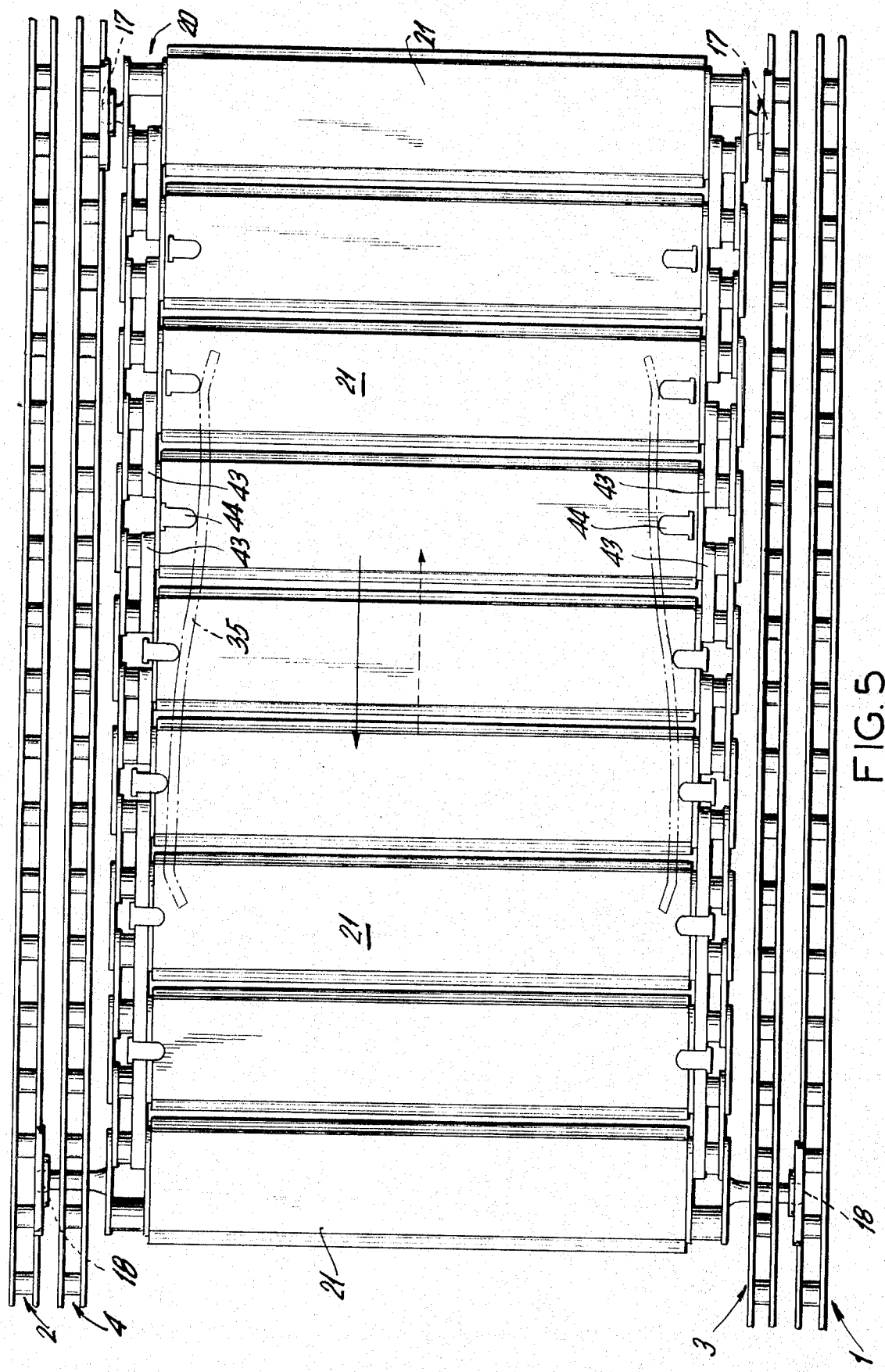
FIG. 5 is a developed plan view showing the keep plates being inserted between the respective link plates of the carrier platform through the medium of guide rails.

As shown in FIG. 4C, each keep plate 44 has shrink-fitted thereto an end of a supporting shaft 50 which is journaled in a bearing 54 provided in an intermediate links 39, articulatedly interconnecting adjacent support links 43; having an attachment for mounting of the plate assembly 21 of the carrier platform, and a collar 52 is fixed at the other end of supporting shaft 50 by means of a set-screw. It will also be noted that the supporting shaft bearing and mounting fixtures 53 are embedded in and anchored to the plate assembly 21 by means of bolts, and a spring 51 is interposed between mounting fixture 53 and collar 52 on always exert to said keep plate 44 a force tending to pull out the keep plate from between the support links 43. When leaving the lifting route, the carrier 200 passes round the guide rollers 22, at which position the support links 43 are opened out like a fan, whereby the keep plates 44 are disengaged from the support links 43 by the force of springs 51 and move to the positions 44', whereafter the carrier platform 200 is freely bendable either forwardly or backwardly as long as it is within the return route.

At both ends of the carrier platform 200 there are provided the chain rollers 48 and chain pins 49 adapted to support shafts attached to links 42, and which project from both sides of the carrier platform 200 and are supported by the endless chains 3, 4 or 1, 2 at supporting points 17 or 18. At the part where the shaft of each link 42 intersects the suspended chain 4 is provided an escape link 19 whereby the chain 4 escapes the link plate 42, as shown in FIG. 4B. The same holds true with the suspended chain 3. In case the suspended chains 1–4 make circulation motion in the direction opposite to that indicated by arrow E, the keep plates 44 and link plates 43 are brought into engagement with each other by the guide rails 34 provided adjacent the guide rollers 22, thereby retaining the plane condition of the carrier platform 200. Engagement between the keep plates 44 and link plates 43 are released at the position of the guide rollers 25. It is to be noted that each keep plate 44 has at its end an edge 55 adapted to prevent inadvertent release of the engaged relation between the keep plates 44 and link plates 43.

Thus, lift loader according to the present invention, which has the above-described construction, allows continuous goods lifting operation between the suitably selected transfer points, and each carrier platform makes smooth circulation motion, while retaining goods thereon always in a stable state. The keep plates are light in weight, operate smoothly and positively and are highly durable in use. They are also easy to exchange or to repair. Further, there is little restriction in the size of the passage route of goods or in the space for installation of the engine and other attachments. It is also possible to make arrangement such that the distance in the horizontal direction between the goods transfer points is unchanged according to variation of the lifting stroke. Also, adjustment of the suspended chains may be achieved by means suitaed to the designing conditions of the lift loader as a whole.

What we claim is:

1. A lift loader comprising, in combination, a supporting frame; four endless chains arranged in two sets each including two laterally spaced endless chains, each set of chains being trained around a respective set of pairs of sprockets rotatably mounted on said frame; at least one substantially rectangular platform constituting a goods carrier; respective ball joints connecting each end of said platform to a respective set of said endless chains; said sets of paired sprockets being positioned on said frame to define, for said endless chains, an endless path including a platform lifting and lowering run, a platform return run and a pair of vertically spaced horizontal runs; means driving all four endless chains in synchronism with each other along said endless path; a goods loading station at one end of one horizontal run, and a goods discharge station at the opposite end of the other horizontal run; each platform including a pair of laterally spaced link chains having support links articulatedly interconnected by intermediate links, a plurality of transversely extending juxtaposed support plates each secured on a respective pair of support links, and retaining means insertable between adjacent support links to prevent relative pivoting of said support plates; means operable, as each platform leaves the return run and enters a horizontal run adjacent said goods loading station, to insert said retaining means between adjacent support links to maintain a horizontal planar orientation of the platform while the latter passes along said lifting and lowering run; and means operable, as each platform leaves the horizontal run adjacent said goods discharge station and enters the return run, to retract said retaining means from between adjacent support links to provide for relative pivoting of said support plates while the platform passes along said return run.

2. A lift loader, as claimed in claim 1, in which adjacent support links have facing end surfaces which are spaced longitudinally from each other; said retaining means comprising keeper plates insertable between said facing end surfaces when said platform has a convex orientation; said keeper plates having widths substantially equal to the distance between said facing end surfaces when said platform has a planar orientation with said support plates having their surfaces lying in a common plane.

3. A lift loader, as claimed in claim 1, in which said keeper plates are slidably supported by said intermediate links for movement transversely of said platform; said means operable to retract said retaining means comprising springs biasing each keeper plate to a retracted position; said means operable to insert said retaining means comprising guide rails engageable with said keeper plates to project the same outwardly against the bias of the associated springs.

4. A lift loader, as claimed in claim 3, including projecting lips on each keeper plate engageable with the outer surfaces of the associated adjacent support links to retain the keeper plates in position against the bias of the associated springs; said support links, as the platform assumes a convex curvature when entering said return run, spreading apart sufficiently to release said keeper plates.

5. A lift loader, as claimed in claim 1, in which said supporting frame includes an upper section and a lower section capable of relative vertical displacement to adjust the effective height of the lift loader; said sets of chains, in said platform return run, extending through a compensation loop; said sets of paired sprockets including paired sprockets engaged with said endless chains in said compensation loop; and mean selectively operable to adjust the last named paired sprockets to adjust the size of said compensation loop to compensate for changes in the height of said lift loader.

6. A lift loader, as claimed in claim 5, in which said lower frame section comprises a substantially horizontal base having a pair of longitudinally extending laterally spaced members; said members, adjacent one end thereof, being formed with laterally aligned longitudinally extending slots; said sprocket pair engaged with said compensation loop being mounted on a common axle extending through said slots; and means operable to adjust the position of said common axle longitudinally of said slots.

* * * * *